US 6,546,465 B1

(12) United States Patent
Bertone (10) Patent No.: US 6,546,465 B1
(45) Date of Patent: Apr. 8, 2003

(54) CHAINING DIRECTORY READS AND WRITES TO REDUCE DRAM BANDWIDTH IN A DIRECTORY BASED CC-NUMA PROTOCOL

(75) Inventor: Michael S. Bertone, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 09/652,315

(22) Filed: Aug. 31, 2000

(51) Int. Cl.[7] .............................................. G06F 12/00
(52) U.S. Cl. ...................................... 711/144; 711/146
(58) Field of Search ........................ 711/118, 141–146, 711/148, 150, 158

(56) References Cited

U.S. PATENT DOCUMENTS

| | | | |
|---|---|---|---|
| 5,261,066 A | 11/1993 | Jouppi et al. ................ | 395/425 |
| 5,317,718 A | 5/1994 | Jouppi ........................ | 395/425 |
| 5,758,183 A | 5/1998 | Scales ........................ | 395/825 |
| 5,761,729 A | 6/1998 | Scales ........................ | 711/148 |
| 5,787,480 A | 7/1998 | Scales et al. ................ | 711/148 |
| 5,802,585 A | 9/1998 | Scales et al. ................ | 711/154 |
| 5,809,450 A | 9/1998 | Chrysos et al. ............. | 702/186 |
| 5,875,151 A | 2/1999 | Mick .......................... | 365/233 |
| 5,890,201 A | 3/1999 | McLellan et al. ........... | 711/108 |
| 5,893,931 A | 4/1999 | Peng et al. .................. | 711/206 |
| 5,918,250 A | 6/1999 | Hammond ................... | 711/205 |
| 5,918,251 A | 6/1999 | Yamada et al. ............. | 711/207 |
| 5,923,872 A | 7/1999 | Chrysos et al. ............. | 395/591 |
| 5,950,228 A | 9/1999 | Scales et al. ................ | 711/148 |
| 5,964,867 A | 10/1999 | Anderson et al. ........... | 712/219 |
| 5,983,325 A | 11/1999 | Lewchuk .................... | 711/137 |
| 6,000,044 A | 12/1999 | Chrysos et al. ................ | 714/47 |
| 6,070,227 A | 5/2000 | Rokicki ....................... | 711/117 |
| 6,085,300 A | 7/2000 | Sunaga et al. .............. | 711/168 |
| 6,256,718 B1 * | 7/2001 | Uchida ....................... | 711/171 |
| 6,343,346 B1 * | 1/2002 | Olnowich .................... | 711/121 |
| 6,349,361 B1 * | 2/2002 | Altman et al. ............... | 711/121 |

OTHER PUBLICATIONS

U.S. patent application Ser. No. 09/653,642, filed Aug. 31, 2000, Apparatus And Method For Interfacing A High Speed Scan–Path With Slow–Speed Test Equipment.

U.S. patent application Ser. No. 09/652,322, filed Aug. 31, 2000, Priority Rules For Reducing Network Message Routing Latency.

(List continued on next page.)

*Primary Examiner*—Matthew Kim
*Assistant Examiner*—Woo H. Choi
(74) *Attorney, Agent, or Firm*—Conley Rose, P.C.

(57) ABSTRACT

A multi-processor computer system comprising a plurality of processors, each comprising at least one memory cache and a memory. Each processor also includes a memory controller that includes a front-end section with a directory in-flight table and a decoder configured to read and write to each entry in the directory in-flight table. The front-end is configured to manage a directory based coherence protocol and validate directory information for each transaction in the directory in-flight table. Memory requests from the processors are allocated in the directory in-flight table and when multiple memory requests have the same memory address, redundant directory read and directory write requests are redirected and are executed internal to the memory controller. Each memory request entry in the directory in-flight table comprises the following fields: a memory address, a valid bit, a directory state, and an end bit. Transactions in the directory in-flight table with common memory address fields are linked in a list. A directory read request is executed for the first transaction in the list and a directory write request is executed for the last transaction in the list. When the valid bit in an entry is set, the directory state of that entry is assumed valid and a directory read request is not executed. When the end bit in an entry is not set, a write request is not sent to memory, but rather the directory state is written to the next transaction in the list and the valid bit for that transaction is set.

18 Claims, 3 Drawing Sheets

OTHER PUBLICATIONS

U.S. patent application Ser. No. 09/652,703, filed Aug. 31, 2000, Scalable Directory Based Cacher Coherence Protocol.

U.S. patent application Ser. No. 09/652,391, filed Aug. 31, 2000, Scalable Efficient I/O Port Protocol.

U.S. patent application Ser. No. 09/652,552, filed Aug. 31, 2000, Efficient Translation Lookaside Buffer Miss Processing In Computer Systems With A Large Range Of Page Sizes.

U.S. patent application Ser. No. 09/651,949, filed Aug. 31, 2000, Fault Containment And Error Recovery Techniques In A Scalable Multiprocessor.

U.S. patent application Ser. No. 09/652,834, filed Aug. 31, 2000, Speculative Directory Writes in A Directory Based Cache Coherent Nonuniform Memory Access Protocol.

U.S. patent application Ser. No. 09/652,314, filed Aug. 31, 2000, Special Encoding Of Known Bad Data.

U.S. patent application Ser. No. 09/652,165, filed Aug. 31, 2000, Broadcast Invalidate Scheme.

U.S. patent application Ser. No. 09/652,704, filed Aug. 31, 2000, Mechanism To Track All Open Pages In A DRAM Memory System.

U.S. patent application Ser. No. 09/653,093, filed Aug. 31, 2000, Programmable DRAM Address Mapping Mechanism.

U.S. patent application Ser. No. 09/652,323, filed Aug. 31, 2000, Computer Architecture And System For Efficient Management Of Bi-Directional Bus.

U.S. patent application Ser. No. 09/652,452, filed Aug. 31, 2000, An Efficient Address Interleaving With Simultaneous Multiple Locality Options.

U.S. patent application Ser. No. 09/653,092, filed Aug. 31, 2000, A High Performance Way Allocation Strategy For A Multi-Way Associative Cache System.

U.S. patent application Ser. No. 09/651,948, filed Aug. 31, 2000, Method And System For Absorbing Defects In High Performance Microprocessor With A Large N-Way Set Associative Cache.

U.S. patent application Ser. No. 09/652,324, filed Aug. 31, 2000, A Method For Reducing Directory Writes And Latency In A High Performance, Directory-Based, Coherency Protocol.

U.S. patent application Ser. No. 09/653,094, filed Aug. 31, 2000, Mechanism To Reorder Memory Read And Write Transactions For Reduced Latency And Increased Bandwidth.

U.S. patent application Ser. No. 09/652,325, filed Aug. 31, 2000, System For Minimizing Memory Bank Conflicts In A Computer System.

U.S. patent application Ser. No. 09/651,945, filed Aug. 31, 2000, Computer Resource Management And Allocation System.

U.S. patent application Ser. No. 09/653,643, filed Aug. 31, 2000, Input Data Recovery Scheme.

U.S. patent application Ser. No. 09/652,451, filed Aug. 31, 2000, Fast Lane Prefetching.

U.S. patent application Ser. No. 09/652,480, filed Aug. 31, 2000, Mechanism For Synchronizing Multiple Skewed Source-Synchronous Data Channels With Automatic Initialization Feature.

U.S. patent application Ser. No. 09/651,924, filed Aug. 31, 2000, Mechanism To Control The Allocation Of An N-Source Shared Buffer.

*Alpha Architecture Reference Manual*, Third Edition, The Alpha Architecture Committee, 1998 Digital Equipment Corporation (21 p.), in particular pp. 3–1 through 3–15.

*A Logic Design Structure For LSI Testability*, E. B. Eichelberger et al., 1977 IEEE (pp. 462–468).

*Direct RDRAM ™ 256/288–Mbit (512K×16/18×32s)*, Preliminary Information Document DL0060 Version 1.01 (69 p.).

*Testability Features of AMD–K6 ™ Microprocessor*, R. S. Fetherston et al., Advanced Micro Devices (8 p.).

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM ™ Module (with 128/144Mb RDRAMs)*, Preliminary Information, Document DL0084 Version 1.1 (12 p.).

*Direct Rambus ™ RIMM ™ Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

* cited by examiner

CHAINING DIRECTORY READS AND WRITES TO REDUCE DRAM BANDWIDTH IN A DIRECTORY BASED CC-NUMA PROTOCOL

CROSS-REFERENCE TO RELATED APPLICATIONS

This application relates to the following commonly assigned applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable, Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,165, filed Aug. 31, 2000, "Mechanism To Track All Open Pages In A DRAM Memory System," Ser. No. 09/652,704, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Computer Resource Management And Allocation System," Ser. No. 09/651,945, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, and "Mechanism To Control The Allocation Of An N-Source Shared Buffer," Ser. No. 09/651,924, filed Aug. 31, 2000, all of which are incorporated by reference herein.

STATEMENT REGARDING FEDERALLY SPONSORED RESEARCH OR DEVELOPMENT

Not Aplicable

BACKGROUND OF THE INVENTION

1. Field of the Invention

The present invention generally relates to a computer system comprising a plurality of pipelined, superscalar microprocessors and implementing a directory-based cache coherency protocol. More particularly, the invention relates to a method of improving bandwidth and performance in a such a system by eliminating redundant directory read and write requests.

2. Background of the Invention

It often is desirable to include multiple processors in a single computer system. This is especially true for computationally intensive applications and applications that otherwise can benefit from having more than one processor simultaneously performing various tasks. It is not uncommon for a multi-processor system to have 2 or 4 or more processors working in concert with one another. Typically, each processor couples to at least one and perhaps three or four other processors.

Such systems usually require data and commands (e.g., read requests, write requests, etc.) to be transmitted from one processor to another. Furthermore, the processors may be executing tasks and working on identical problems which requires that data be shared among the processors. This data is commonly stored in a memory location that may be adjacent to each processor or may be located in a distinctly separate location. In either event, the processor must access the data from memory. If the memory is some distance away from the processor, delays are incurred as the data request is transmitted to a memory controller and the data is transmitted back to the processor. To alleviate this type of problem, a memory cache may be coupled to each processor. The memory cache is used to store "local" copies of data that is "permanently" stored at the master memory location. Since the data is local, fetch and retrieve times are reduced thereby decreasing execution times. The memory controller may distribute copies of that same data to other processors as needed.

Successful implementation of this type of memory structure requires a method of keeping track of the copies of data that are delivered to the various cache blocks. The particular method chosen depends on the cache coherency protocol implemented for that particular multi-processor system. Cache coherency, in part, means that only one microprocessor can modify any part of the data at any one time, otherwise the state of the system would be nondeterministic. In one example of a cache coherency protocol, the memory controller will broadcast requests to each processor in the system, regardless of whether or not the processors have a copy of the data block. This approach tends to require less bookkeeping since the memory controller and processors do not need to keep track of how many copies of data exist in the memory structure. However, bandwidth is hindered because processors must check to see if there is a local copy of the data block each time the processor receives a request.

Another conventional cache coherency protocol is a directory-based protocol. In this type of system, the memory controller keeps a master list, or directory, of the data in main memory. When copies of the data are distributed to the individual processors, the memory controller will note the processor to which the data was sent and the state of that data. In addition, the data that is delivered to a particular data cache will include information about the memory address from where the data resides and the directory state for that particular block of data. Since the memory controller tracks the processors that have copies of the same block of data, bandwidth may be conserved by limiting memory read and write requests to only those processors which have a copy of a data block in the local cache.

When a processor makes a memory request for a particular block of data, a read request goes to the directory controller which then makes some decision based on the existence and state of that data block. This decision may be as simple as locating the data block and sending that data back to the requesting processor. In another example, the memory controller may determine that the data block does not exist in the local memory and send or forward a memory request to the actual location of the data block. The owner at this location will then send the data block back to the requestor. In either event, the memory controller follows the read request with a write request that instructs the directory to update the address and cache state information for that data block.

Some multi-processor systems have a means of buffering these memory requests. In such systems, it is highly likely that memory requests to the same block of data may exist in the request buffer at the same time. It may also be the case that only the directory information and not the actual data block is read. This type of scenario is likely in a multiprocessor system executing a spin lock initialization. In a spin lock, a processor will attempt to test-and-set a memory location (the lock) associated with a data block to be accessed. If the test indicates that the set succeeded, the processor may proceed to access or modify the data associated with the lock. If the test indicates that the set failed, that is, the lock is already owned by another processor, then the processor will loop back and execute the test-and-set until the set succeeds and the lock is obtained. This lock is known as a spin lock because the processor "spins" in a tight loop waiting to acquire the lock. Since requests are repeatedly accessing the same memory address, it is quite feasible that the memory request buffer will contain multiple requests for the same memory block.

In a conventional system, when a memory request is executed, the current cache directory state must be read and updated for each block of data so cache coherency is maintained. A directory read request is sent to memory to determine the current directory state of the data block. After the memory request is executed, the next state in the directory field for that cache block is updated (if needed) and a directory write request is sent back to memory to update the directory state for the memory block. As transactions are processed, a conventional system completes the directory read and directory write pairs for each transaction.

It is desirable therefore, to develop a method of eliminating redundancy in memory requests by chaining directory requests using local, known good information about a memory block to execute directory read and write requests locally. Since the latest cache state information is written to directory entries in the memory request buffer, there is no need for subsequent directory requests for a common memory address to go to memory. The information can be read from the directory entry for a request that contains valid directory state information and this information can be applied to all other requests that reference the same memory address. This process eliminates the need to transmit read and write requests between the memory request buffer and memory and may advantageously improve bandwidth and execution speeds.

BRIEF SUMMARY OF THE INVENTION

The problems noted above are solved in large part by a directory-based multiprocessor cache control system that uses a memory transaction buffer called a directory in-flight table. The directory in-flight table may hold up to 32 memory requests, some of which may access the same block of memory. These common memory requests may be placed in a linked list which is used to eliminate unnecessary directory read and directory write requests to memory.

The system includes a plurality of processors, each comprising at least one memory cache and a memory. Each processor also includes a memory controller that includes a front-end section, a middle section and a back-end section. The front-end includes a directory in-flight table and a decoder configured to read and write to each entry in the directory in-flight table. The front-end is also configured to manage a directory based coherence protocol and validate directory information for each transaction in the directory in-flight table. Memory requests from the processors are allocated in the directory in-flight table.

Each memory request entry in the directory in-flight table comprises fields for a memory address, a requestor processor identification, a valid bit, a directory state, a behind entry number, and an end bit. These fields are used, in part, to create the linked list of requests with a common memory address and to eliminate unnecessary memory directory read and write requests. For instance, when the valid bit in a transaction entry is set, the directory state of that entry is assumed valid and the front-end decoder does not send a read request to memory. Conversely, when the valid bit in a transaction entry is not set, the front-end decoder sends a directory read request to memory and updates the directory state field of that entry with directory state information from memory.

Similarly, when the end bit in a transaction entry is not set, the front-end decoder does not send a write request to memory. Instead, the transaction is retired and the directory state is written to the next transaction in the list and the valid bit for that next transaction is set. This retiring process accomplishes two things: it eliminates a directory write request to memory and it validates the directory state for the next transaction which eliminates a subsequent directory read request. A set end bit signifies the end of a list of transactions accessing the same memory block. If the end bit in a transaction entry is set, the front-end decoder sends a directory write request to memory to update the directory state of the memory block corresponding to the address in the memory address field.

When a new memory request is allocated to the directory in-flight table, that memory request is automatically appended to the end of a list. Hence, the end bit for all new memory requests is set. Each list contains memory requests that reference a common memory block. Thus, the list may contain only the new request or it may include many memory requests with common memory addresses. If the contents of the memory address field for the new request are identical to memory address fields of existing memory requests already in the directory in-flight table, the new memory request is added to an existing list. In this case, the behind entry number field for the new entry is filled with the location of the existing entry in the list that has a set end bit (i.e., the previous end of the list). The end bits for all existing entries containing the same memory addresses (all entries in the list other than the new request) are reset.

The front-end further comprises control logic that is configured to transmit information in both directions between the decoder and memory or to loop information that is leaving the decoder back to the decoder. The act of retiring a transaction asserts a retire control signal from the decoder. When the retire signal is asserted, the control logic loops information that is leaving the decoder back to the decoder. When the retire signal is not asserted, the control logic permits information to travel between the decoder and memory. Thus, when a memory request entry in the directory in-flight table that does not have a set end bit is processed by the front-end, the request is retired from the directory in-flight table and the retire signal is asserted. The directory state information from the retiring entry is written by the decoder to the entry in the directory in-flight table that has the location of the retiring entry in its behind entry number field (i.e.; the next entry in the list) and the valid bit for that next entry is set.

Thus, in the manner described above, the preferred embodiment may eliminate unnecessary directory read an directory write traffic, which may advantageously improve memory bandwidth and memory access times.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

The preferred embodiment of the memory request chaining scheme is directed toward application in a memory request buffer used in a multi-processor computer system. While the preferred embodiment may be implemented in a variety of applications, a detailed description in the context of the multi-processor computer system is provided herein. The descriptions herein are not intended to limit the scope of the claim limitations set forth in this specification.

Figure 1:
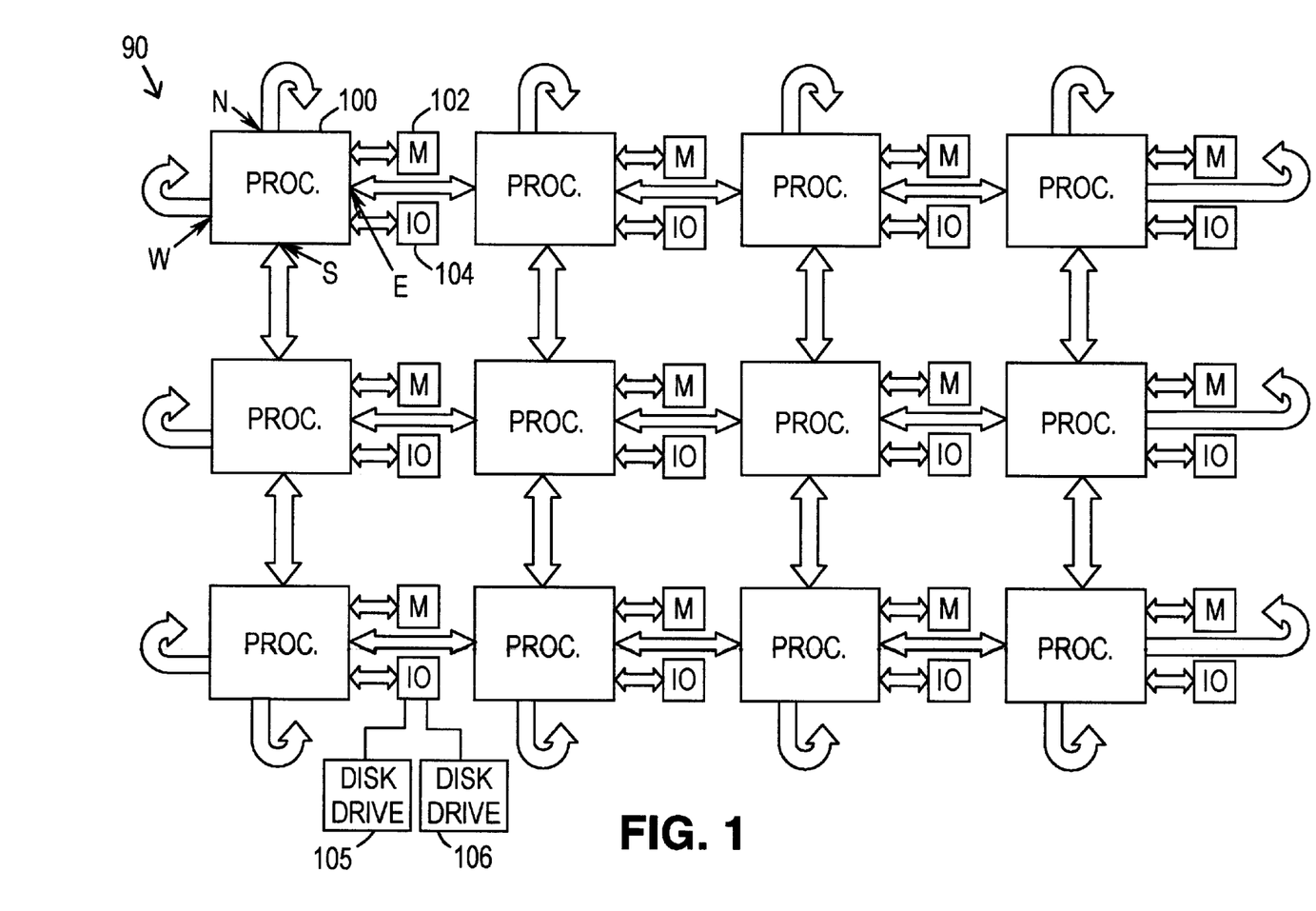
FIG. 1 shows a system diagram of a plurality of microprocessors coupled together.

Referring now to FIG. 1, in accordance with the preferred embodiment of the invention, computer system 90 comprises one or more processors 100 coupled to a memory 102 and an input/output ("I/O") controller 104. As shown, computer system 90 includes twelve processors 100, each processor coupled to a memory and an I/O controller. Each processor preferably includes four ports for connection to adjacent processors. The interprocessor ports are designated "North," "South," "East," and "West" in accordance with the well-known Manhattan grid architecture also known as a crossbar interconnection network architecture. As such, each processor 100 can be connected to four other processors. The processors on both ends of the system layout wrap around and connect to processors on the opposite side to implement a 2D torus-type connection. Although twelve processors 100 are shown in the exemplary embodiment of FIG. 1, any desired number of processors (e.g., 256) can be included. For purposes of the following discussion, the processor in the upper, left-hand corner of FIG. 1 will be discussed with the understanding that the other processors 100 are similarly configured in the preferred embodiment.

As noted, each processor preferably has an associated I/O controller 104. The I/O controller 104 provides an interface to various input/output devices such as disk drives 105 and 106, as shown in the lower, left-hand corner of FIG. 1. Data from the I/O devices thus enters the 2D torus via the I/O controllers.

Figure 2:
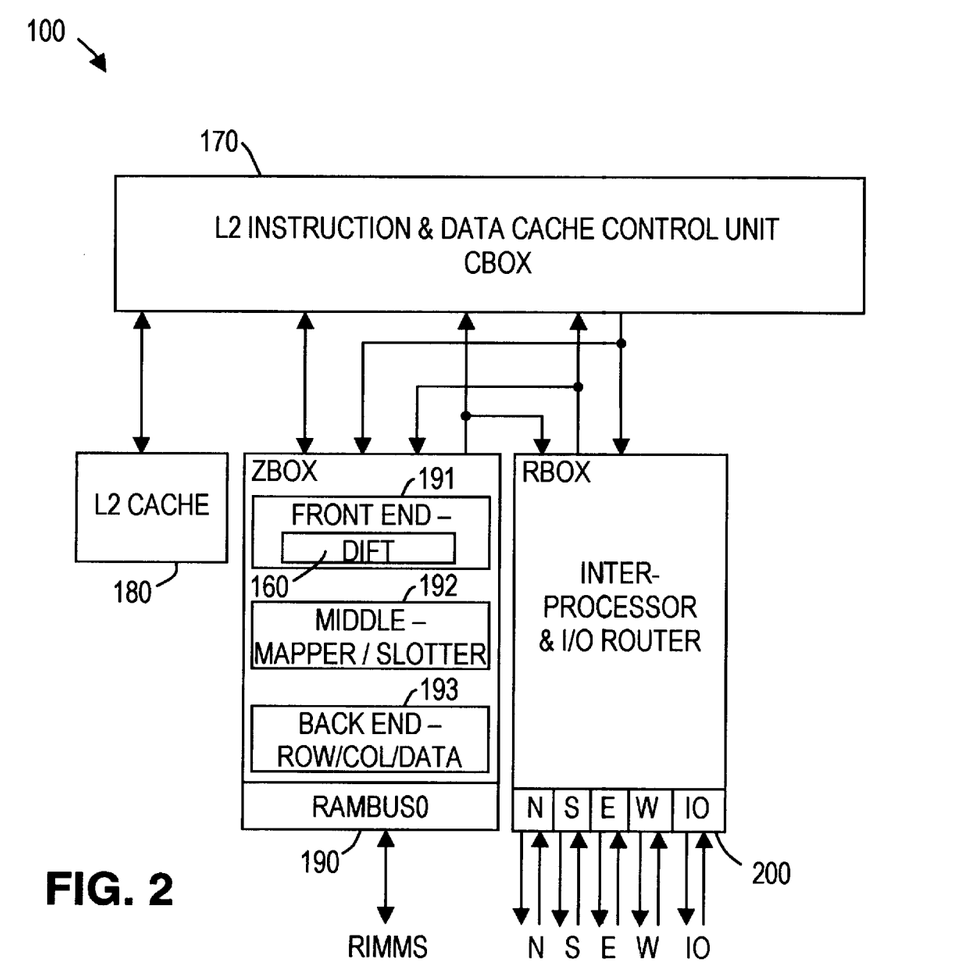
FIG. 2 shows a block diagram of a microprocessor memory controller in which the preferred embodiment is implemented.

Each processor also, preferably, has an associated memory 102. In accordance with the preferred embodiment, the memory 102 preferably comprises RAMbus™ memory devices, but other types of memory devices can be used, if desired. The capacity of the memory devices 102 can be any suitable size. Further, memory devices 102 preferably are implemented as Rambus Interface Memory Modules ("RIMM"). To aid in the control of distributed memory in the multiprocessor system, each processor includes a memory manager and directory structure for the local memory source. A preferred embodiment of the memory controller is shown in FIG. 2.

In general, computer system 90 can be configured so that any processor 100 can access its own memory 102 and I/O devices, as well as the memory and I/O devices of all other processors in the system. Preferably, the computer system may have physical connections between each processor resulting in low interprocessor communication times and improved memory and I/O device access reliability. If physical connections are not present between each pair of processors, a pass-through or bypass path is preferably implemented in each processor that permits accesses to a processor's memory and I/O devices by another processor through one or more pass-through processors. data cache control unit ("Cbox") 170, an L2 data cache 180, a memory controller ("Zbox") 190, and an interprocessor and I/O router unit ("Rbox") 200. The following discussion describes each of these units.

Each of the functional units 170, 180, 190, 200 contains control logic that communicates with the control logic of other functional units as shown. Other functional units may exist within the processor 100, but have been omitted from FIG. 1 for clarity in the description of the preferred embodiment. For example, the processor may further comprise integer and floating-point execution units, a memory reference unit, and an instruction fetch, issue and retire unit.

The L2 instruction and data cache control unit ("Cbox") 170 controls the L2 instruction and data cache 180 and handles data accesses from other functional units in the processor, other processors in the computer system, or any other devices that might need data out of the L2 cache.

The interprocessor and I/O router unit ("Rbox") 200 provides the interfaces to as many as four other processors and one I/O controller 104 (FIG. 1). The inter-processor interfaces are designated as North ("N"), South ("S"), East ("E"), and West ("W") and provide two-way communication between adjacent processors.

Processor 100 preferably includes at least one RAMbus™ memory controller 190 ("Zbox"). The Zbox 190 controls 4 or 5 channels of information flow with the main memory 102 (FIG. 1). The Zbox 190 preferably includes a back end 193, a middle 192, and a front-end 191. The middle section 192 includes a mapper which maps the physical address into RAMbus™ device format by device, bank, row, and column. The middle mapper 192 also maintains an open-page table to track all open pages and to close pages on demand if bank conflicts arise. The mapper 192 also schedules RAMbus™ transactions such as timer-base request queues. The Zbox back end 193 preferably packetizes the address, control, and data into RAMbus™ format and provides the electrical interface to the RAMbus™ Tm devices themselves.

The Zbox front-end 191 performs a number of functions such as managing the processor's directory-based memory coherency protocol, processing request commands from the Cbox 170 and Rbox 200, sending forward commands to the Rbox 200, sending response commands to and receiving packets from the Cbox 170 and Rbox 200.

The front-end 191 also comprises a shared request buffer called a directory in-flight table ("DIFT") 160 for tracking up to 32 in-flight transactions. These transaction requests or packets are received from the Cbox 170 or the Rbox 200. The requests from the Cbox 170 are from the local processor chip whereas requests from the Rbox 200 are off chip requests. Among the types of transactions that are sent to the front-end DIFT 191 are memory requests. The front-end DIFT 191 sends memory requests to the Zbox middle section 192 and, if necessary, instructs the Zbox back end 193 to satisfy the memory request by writing the data block to the appropriate destination.

While these requests are in the DIFT 160, the front-end 191 examines the directory information and directory state associated with each transaction prior to sending the requests to the middle section 192. The directory information is validated for each transaction in the DIFT 160 to maintain cache coherency. In executing a memory request, it is likely that the cache state for a given block of data must be changed. A directory read is first sent from the front-end 191 to main memory, then some action is taken to service the request and lastly, a directory write is sent back to memory indicating the next directory state for the data block. In the preferred embodiment, this validation process is initiated by examining a bit field, called a valid bit, in the DIFT entry for a particular transaction. An example of a DIFT entry 300 used in the preferred embodiment is shown in FIG. 3.

Figure 3:
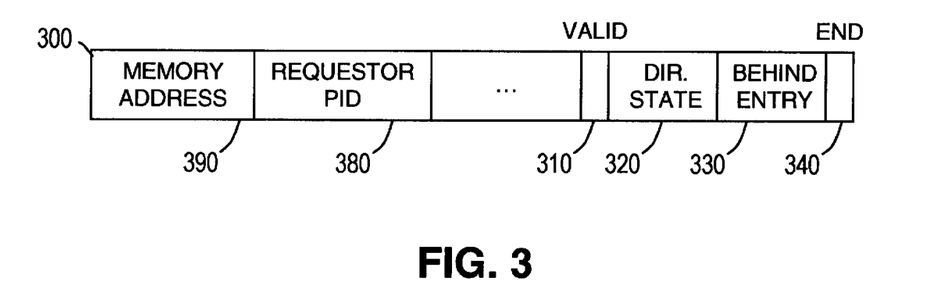
FIG. 3 shows a preferred directory entry used in implementing the preferred embodiment.

Referring to FIG. 3, a DIFT entry 300 is a data packet with bit fields containing various information. Included in the DIFT entry 300 are fields for memory address 390 and requester processor identification 380. Also included in a DIFT entry 300 are fields for a valid bit 310, directory state 320, behind entry number 330, and an end bit 340. The fields shown in FIG. 3 are used in the preferred embodiment and an actual DIFT entry 300 may alternatively have more fields than those depicted. The description herein and the scope of the claim limitations are not intended to limit the DIFT entry 300 only to the entries described.

Figure 4:
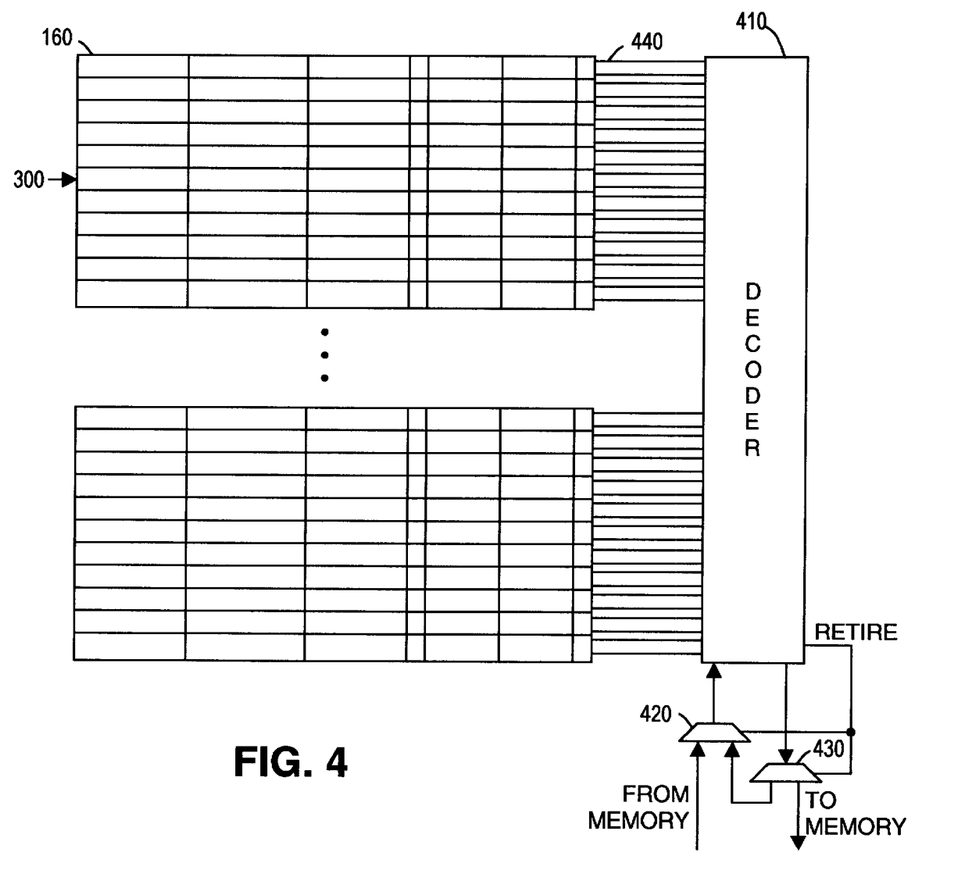
FIG. 4 shows a schematic representation of the directory in-flight table and decoder logic in the memory controller of FIG. 2.

The process of examining and validating directory information for transactions in the front-end DIFT 191 can be explained with the aid of FIG. 4. FIG. 4 shows the DIFT 160, a decoder 410, a multiplexer ("MUX") 420, and demultiplexer ("DEMUX") 430. The MUX 420 and DEMUX 430 are configured to redirect directory read ("Dr") and directory write ("Dw") commands. The decoder 410 has read and write ports 440 for each entry in the DIFT 160. This allows the decoder to read and write to the individual fields for each DIFT entry 300.

As discussed above, the process of validating the directory information is initiated by examining the valid bit in the DIFT entry 300. If this bit is not set, the front-end 191 will send a Dr request to memory to read the current directory state for the current data block. The directory state from memory is written by the decoder 410 to directory state field 320 for the current transaction. At the same time, the valid bit 310 for that transaction is set indicating that the directory state field 320 is valid. In the preferred embodiment, if multiple transactions are accessing the same memory address 390, those transactions are grouped into a linked list. The redundant Dr and Dw commands for transactions in this list are processed internally and are not sent to memory. The transactions in this list are processed sequentially and only the Dr request for the first transaction in the list and the Dw request for the last transaction in the list are sent to main memory.

The redundant Dw and Dr commands are eliminated, in part, by changing information in the valid bit 310, behind entry number 330 and end bit 340 fields in the DIFT entry 300. If a valid bit is set in a particular DIFT entry 300, the front-end 191 regards the directory state 320 for that entry as valid and skips the Dr request to read the directory information from main memory. Similarly, if an end bit 340 is not set in a particular DIFT entry 300, the front-end 191 regards the request as one request in a the list of requests accessing a common memory block. The front-end 191 recognizes that this DIFT entry 300 is not the end of the list and will therefore skip the Dw request to main memory. The behind entry number field 330 is used to create the linked list of memory requests that access the same block of memory.

The linked list of memory requests is created or updated as new requests are added to the DIFT 160. Upon allocating a space in the DIFT 160, the memory address 390 of the new request is compared to other requests in the DIFT 160 and if a match is found, the new request is appended to the list. In the event no other requests have the same memory address 390, the end bit 340 is set in the DIFT entry 300 for the new request. This indicates that the new request is the beginning and the end of a list that includes only one request. If there are existing requests in the DIFT 160 that have a common memory address 390, one of these existing requests has the end bit 340 set in its DIFT entry 300, which means that request is the end of the list. The new request is added to the list by placing the number of the existing ending request into the behind entry number field 330 in the DIFT entry 300 for the new request. At the same time, the end bit 340 for the request that was the end of the list is reset and the end bit 340 for the new request is set.

For example, consider that two of the 32 DIFT transactions have the same memory address 390. Further assume that these transactions reside in entries 3 and 17 in the DIFT 160. If the request in entry 3 was the first of these two requests allocated in the DIFT 160, then the behind entry number field 330 for entry 17 will hold the number 3 indicating that entry 17 is behind entry 3. In addition, the end bit 340 for entry 17 will be set indicating entry 17 is the end of the list. If a new request is allocated to the DIFT 160 that has the same memory address as the transactions in entries 3 and 17, then the behind entry field 330 for the new request will be filled with the number 17. The end bit 340 will be set in the entry for the new request and will be reset for entry 17.

It should be noted that the polarity of the end and valid bits need not be active in the set position as discussed in the preferred embodiment above. The active state for these bits is optional. Furthermore, it should also be noted that in the preferred embodiment, the end bit 340 is always set in DIFT entries 300 for new requests allocated to the DIFT 160. In addition, an alternative embodiment may be implemented whereby the end bit 340 for all requests in a list other than the ending request are reset whenever a new request is allocated in the DIFT 160.

The valid bit 310 in a DEFT entry 300 for a memory request is preferably set in one of two different ways. One way is when a transaction in the DIFT 160 has a unique memory address. In this case, the Dr and Dw commands for this transaction are executed in a conventional manner and the valid bit 310 is set when the Dr command is completed. The other way is when the memory request is in the middle (not the beginning or the end) of a list of requests accessing a common block of data. When the front-end 191 processes the first request in a list of common memory requests, the valid bit 310 for that DIFT entry 300 will most probably not be set. If this valid bit 310 is not set, the front-end 191 will send a Dr request to memory to check the current directory state 320 for the memory block. The response from the memory will arrive at the decoder 410 which will then update the directory state 320 in the DIFT entry 300 for that request as required and set the valid bit 310 for that request.

Since the first request in the list does not have the end bit 340 set, the front-end 191 skips the Dw request and retires the request. The front-end 191 locates the second request in a list by examining the behind entry fields 330 in the DIFT 160. Upon retiring this first request, the cache state for the second request in the list is updated by the decoder 410 as required and the valid bit 310 for this second request is set. Thus, when the front-end 191 turns to process this second request in the list, the valid bit is already set and no Dr request is needed. Similarly, if the second request in the list is not the end of the list (if the end bit 340 is not set), no Dw request is needed. The front-end 191 proceeds in this manner through all requests in the list until the last request is reached. When the last request in a list is reached, the valid bit 310 and end bit 340 will be set. As the memory request is processed the front-end 191 sends the Dw request to main memory. In this manner, all intermediate Dw and Dr requests to memory are bypassed and only the first Dr request and last Dw request are sent to memory.

The bypass mechanism used to prevent Dr and Dw requests from reaching memory is shown in FIG. 4. In normal operation, the multiplexer ("MUX") 420 and demultiplexer ("DEMUX") 430 are configured to allow Dr and Dw requests and responses to travel to and from memory. The MUX 420 and DEMUX 430 are controlled by a retire command that toggles the MUX 420 and DEMUX 430 when a request in a list is retired. The retire process, as described above, occurs when a memory request that is not the end of a list of common memory requests is processed. When such a request is retired, the cache state information for that request is directed back to the next request in the list (as indicated by the behind entry number fields 330 in the DIFT 160) instead of towards memory (as a Dw request). When the retire command toggles the MUX 420 and DEMUX 430, the cache state information from the decoder is routed back to the decoder and is written to the directory state 320 for the next request in the list.

It should be noted that since the structure of a common memory request list is contained within the behind entry number fields 330 for the requests in the list, it is not necessary for the requests in the list to be processed sequentially by the front-end 191. Since the directory state 320 for a request in a list is updated as the prior request is retired, all dependencies to the prior request are eliminated. The Dw and Dr requests for the intermediate requests in the list are already eliminated by setting the valid bit 310 when the prior request is retired and be resetting the end bit 340 as new requests are added to the list. Thus, other requests with different memory addresses may be processed between the requests in a list without affecting the integrity of the list.

The above discussion is meant to be illustrative of the principles and various embodiments of the present invention. Numerous variations and modifications will become apparent to those skilled in the art once the above disclosure is fully appreciated. For example, the invention may be extended to apply to any of a number of systems which use a buffer to store external read and write requests and need not be limited to the memory directory requests described in the preferred embodiment. It is intended that the following claims be interpreted to embrace all such variations and modifications.

What is claimed is:

1. A multi-processor computer system, comprising:
   a plurality of processors, each processor comprising or coupled to at least one memory cache, one cache control unit, and one interprocessor router;
   a memory coupled to each processor;
   at least one input/output device coupled to at least one processor; and
   a memory controller configured to accept memory requests from the plurality of processors and manage a directory-based coherence protocol, said memory controller further comprising:
      a front-end configured to manage the directory based coherence protocol and comprising the directory in-flight table and a decoder configured to read and write to each entry in the directory in-flight table;
      a middle section configured to map memory addresses in the memory requests to an actual memory location; and
      a back-end configured to packetize memory request information for communication with memory;
      wherein the front-end is configured to validate directory information for each transaction in the directory in-flight table;
   wherein the memory requests from the plurality of processors are allocated in a directory in-flight table and wherein when a plurality of memory requests are directed at the same memory address, redundant directory read and directory write requests are not delivered to memory and are executed internal to the memory controller; and
   wherein each memory request entry in the directory in-flight table comprises:
      a memory address field;
      a requester processor identification field;
      a valid bit field;
      a directory state field;
      a behind entry number field; and
      an end bit field;
      wherein when the valid bit in a transaction entry is not set, the front-end decoder sends a directory read request to memory and updates the directory state field of that entry with directory state information returned from memory in response to the read request and wherein when the valid bit is set, the directory state of that entry is assumed valid and the front-end decoder does not send a read request to memory.

2. The computer system of claim 1 wherein:

when the end bit in a transaction entry is set, the front-end decoder sends a directory write request to memory to update the directory state of the memory block corresponding to the address in the memory address field and wherein when the end bit is not set, the front-end decoder does not send a write request to memory.

3. The computer system of claim 1 wherein:

when a new memory request is allocated to the directory in-flight table, the end bit for the new entry is set; and wherein if the contents of the memory address field for the new request are identical to memory address fields of existing memory requests already in the directory in-flight table;

the behind entry number field for the new entry is filled with the location of the existing entry comprising the identical memory address and a set end bit; and the end bits for all existing entries containing identical memory addresses are reset.

4. The computer system of claim 2 wherein:

the front-end further comprises control logic configured to transmit information in both directions between the decoder and memory or to loop information leaving the decoder back to the decoder;

wherein when a retire signal is asserted by the decoder, the control logic loops information leaving the decoder back to the decoder and wherein when the retire signal is not asserted, the control logic permits information to travel between the decoder and memory.

5. The computer system of claim 4 wherein:

when a memory request entry in the directory in-flight table that does not have a set end bit is processed by the front-end;

the request is retired from the directory in-flight table and the retire signal is asserted;

the directory state information from the retiring entry is written by the decoder to the entry in the directory in-flight table with the location of the retiring entry in its behind entry number field; and the valid bit for the entry in the directory in-flight table with the location of the retiring entry in its behind entry number field is set.

6. A computer processor for use in a multi-processor system, comprising:

an associated memory;

a memory controller comprising a memory request buffer;

an L2 data cache;

an L2 instruction and data cache control unit configured to send requests from the processor to the memory controller;

at least one input/output device coupled to the processor; and an interprocessor and I/O router unit configured to send requests from other processors to the memory controller;

wherein when a new request is added to the memory request buffer, if no other memory requests already allocated in the buffer reference the same memory block, the new request is added as the first entry in a linked list and wherein when a new request is added to the memory request buffer, if other memory requests already allocated in the buffer do reference the same memory block, the new request is added as the last entry in a linked list of requests that reference the same memory block;

wherein as requests are executed by the memory controller, if the request is neither the first request nor the last request in a linked list, directory state requests are not sent to the associated memory.

7. The computer processor of claim 6 wherein:

the only directory state requests sent to the associated memory are a directory read request sent to memory when the first request in the linked list is executed and a directory write request sent to memory when the last request in the linked list is executed.

8. The computer processor of claim 7 wherein:

all other directory state requests and updates are executed internal to the memory controller.

9. The computer processor of claim 6 wherein the memory controller further comprises:

a decoder configured to update directory state information for each request in the memory request buffer; and control logic configured to either transmit directory state information between the decoder and the associated memory or to loop directory state information internal to the memory controller.

10. The computer processor of claim 9 wherein:

the control logic is comprised of multiplexers and demultiplexers.

11. The computer processor of claim 6 wherein:

the linked lists are created using data fields assigned to each request in the memory request buffer.

12. A method of eliminating redundant directory state requests in a multi-processor system implementing a directory-based cache coherence, comprising:

allocating memory requests in a memory transaction buffer wherein upon allocating a new memory request to the transaction buffer, comparing the memory address for the new memory request to memory addresses of memory requests already in the transaction buffer;

wherein when no other existing memory requests have a common memory address, adding the new memory request to the transaction buffer as the first entry in a new list; and wherein when other existing memory requests have a common memory address, adding the new memory request to the transaction buffer as the last entry in an existing list of memory requests with a common memory address;

wherein upon processing memory requests in a list of requests with a common memory address, updating cache coherency by sending only a directory read request for the first memory request in the list and a directory write request for the last memory request in the list to memory.

13. The method of claim 12, further comprising:

retiring all memory requests in the list other than the last request in the list;

wherein retiring a memory request comprises validating the directory state for the next memory request in the list with directory state information without sending directory write requests to memory.

14. The method of claim 13, further comprising:

assigning a valid bit field to each memory request in the transaction buffer;

wherein upon completing a directory read request from memory for the first request in a list of requests with a common memory address, asserting the valid bit for that first request in the list; and upon validating the directory state for the next memory request in the list while retiring a memory request, asserting the valid bit for that next memory request in the list;

wherein when the valid bit for a memory request is asserted, skipping the directory read request for that memory request.

15. The method of claim 14, further comprising:

using control logic in a memory controller for each processor in the multi-processor system to loop directory state information back to the memory transaction buffer when a memory request is retired.

16. The method of claim 12, further comprising:

assigning an end bit field to each memory request in the transaction buffer;

wherein upon allocating a new memory request to the transaction buffer, asserting the end bit for that new memory request in the list; and de-asserting the end bit for all other memory requests, if any exist, in the list to which the new memory request is added.

17. The method of claim 16, further comprising:

assigning a behind entry number field to each memory request in the transaction buffer;

wherein when allocating a new memory request to the transaction buffer, if the new memory request is added to an existing list of memory requests with a-common address, adding the new memory request to the list by writing the location of the existing ending request to the behind entry number field for that new memory request in the list.

18. The method of claim 12, further comprising:

reading and writing to memory requests in a memory transaction buffer using a decoder in a memory controller for each processor in the multi-processor system.

* * * * *